United States Patent
Chen et al.

(10) Patent No.: US 8,250,362 B2
(45) Date of Patent: Aug. 21, 2012

(54) HOME NETWORK ENCRYPTION TECHNIQUES

(75) Inventors: Sherman (Xuemin) Chen, San Diego, CA (US); Stephen Palm, Irvine, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 835 days.

(21) Appl. No.: 12/328,007

(22) Filed: Dec. 4, 2008

(65) Prior Publication Data
US 2010/0146266 A1    Jun. 10, 2010

(51) Int. Cl.
*H04L 29/00* (2006.01)
*H04L 29/02* (2006.01)
*G06F 17/30* (2006.01)

(52) U.S. Cl. .......................................... 713/160; 726/26
(58) Field of Classification Search .................. 713/160; 726/26
See application file for complete search history.

(56) References Cited

U.S. PATENT DOCUMENTS

| | | | | |
|---|---|---|---|---|
| 5,805,700 A * | 9/1998 | Nardone et al. | ............... | 380/217 |
| 7,007,170 B2 * | 2/2006 | Morten | ............... | 713/193 |
| 7,039,938 B2 * | 5/2006 | Candelore | ............... | 725/87 |
| 7,124,303 B2 * | 10/2006 | Candelore et al. | ............ | 713/193 |
| 7,151,448 B2 * | 12/2006 | Henderson et al. | ........... | 340/541 |
| 7,167,560 B2 * | 1/2007 | Yu | ............... | 380/200 |
| 7,336,787 B2 * | 2/2008 | Unger et al. | ............... | 380/217 |
| 7,403,622 B2 * | 7/2008 | Diehl et al. | ............... | 380/278 |
| 7,436,955 B2 * | 10/2008 | Yan et al. | ............... | 380/37 |
| 7,502,474 B2 * | 3/2009 | Kaniz et al. | ............... | 380/255 |
| 2004/0242238 A1 * | 12/2004 | Wang et al. | ............... | 455/456.1 |
| 2007/0250912 A1 * | 10/2007 | Rassool et al. | ............... | 726/4 |
| 2009/0259925 A1 * | 10/2009 | Balasubramanian et al. | | 714/807 |

* cited by examiner

*Primary Examiner* — William Powers
(74) *Attorney, Agent, or Firm* — Garlick & Markison; Edward J. Marshall

(57) ABSTRACT

A premises based multimedia communication system includes a source device that produces multimedia content, a rendering device that presents the multimedia content, and a premises communication network coupling the source device to the rendering device. The system certifies transfer of the multimedia content from the source device to the rendering device via the at least one premises communication network using link layer encryption operations. After certification, the system at least partially disables the link layer encryption operations for the transfer of the multimedia content from the source device to the rendering device via the at least one premises communication network. With the link layer operations are at least partially disabled, the system at least partially enables content layer encryption operations for the transfer of the multimedia content from the source device to the rendering device via the at least one premises communication network.

23 Claims, 13 Drawing Sheets

HOME NETWORK ENCRYPTION TECHNIQUES

BACKGROUND

1. Technical Field

The present invention relates generally to the packetized transmission of video and audio information; and, more particularly, to the encryption/decryption and transfer of multimedia content.

2. Related Art

The structure and operation of communication systems is generally known. Communication systems include both wired and wireless communication systems. Examples of wired communication systems are the Public Switched Telephone Network (PSTN), packet switched telephone networks, optical networks, cable networks, Local Area Networks (LANS) such as Ethernet networks, and various other wired networks that communicably couple serviced devices via wired links. Wireless communication systems includes cellular communication systems, Wireless Wide Area Networks (WWANs) such as WiMAX communication systems, satellite based communication systems, fixed wireless communication system, Wireless Local Area Networks (WLANs), and Wireless Personal Area Networks (WPANs), among other wireless networks. The structure and operation of these networks are generally known.

The transport of multimedia content is also generally known. Multimedia content typically includes video content, audio content, metadata, and control information. For example, in a satellite television system, multimedia content stored in a first location or captured via video cameras and sound systems that are at a respective location, e.g., sports stadium, are transferred wirelessly from the content source/capture location via the satellite communication system to a receiving device. The receiving device typically includes both a satellite receiver and a rendering device such as a television and/or multimedia entertainment system. An example of such a structure includes a home based television system that receives the multimedia content via the satellite communication network receiver. A similar structure exists within a cable television communication system where a rendering device couples to a cable television receiver that receives multimedia content from a remote location via the cable network. Broadcast television systems, which have been known for many years, broadcast multimedia content to local recipients that receive such multimedia content via receiving devices. In all cases, one or more rendering devices within the premises, for example at home, will receive and present the multimedia content to one or more users.

Home based/premises based multimedia communication systems typically include source devices, communication networks, and rendering devices. Rendering devices may include, for example, video monitors, surround sound systems, whole house audio networks, combination devices that present both audio and video content, and/or a combination of these. Source devices include receivers of remotely stored/generated content and local storage of the multimedia content. The local storage may include hard disk drives and videotape recording devices, for example. The local storage may receive multimedia content from a remote source via another source device, for example, and store the multimedia content locally for either immediate or later presentation by a rendering device. Further, other source devices within such a home/premises multimedia communication system may produce content from a portable storage device such as a DVD or CD. Such source devices extract multimedia content from the portable storage device and provide the multimedia content to one or more rendering devices for presentation to a user. The home/premises communication network may include one or more wired and/or wireless networks. For example, a home/premises communication network may include an Ethernet network, a cable network, an optical network, and/or one or more wireless networks, which may include one or more WLANs, WPANs, and/or other wireless communication enabling networks.

Various problems exist with regard to not only the receipt but with the presentation of multimedia content within a home/premises multimedia network as well. For example, when a source device that receives multimedia content from a remote source employs the premises communication network for transport of the multimedia content to a rendering device, various problems may exist. These problems may include, for example, selection of available premises communication networks for transport to the rendering device and overcoming a greater bit error rate of the home/premises communication network than that of a remote network that supported delivery of remotely generated content to the servicing source device. Further, Digital Rights Management (DRM) is required for the presentation of some multimedia content. For example, a source of the multimedia content may require that one or more rendering devices of the multimedia content support particular DRM operations. When the home/premises based multimedia communication systems enable the Digital Living Network Alliance (DLNA) operations, particular DRM operations are required. However, these DRM operations, which include encryption at various protocol layers may be not supportable by home/premises communication networks of the home/premises based multimedia communication systems due to their supported Bit Error Rates (BERs).

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
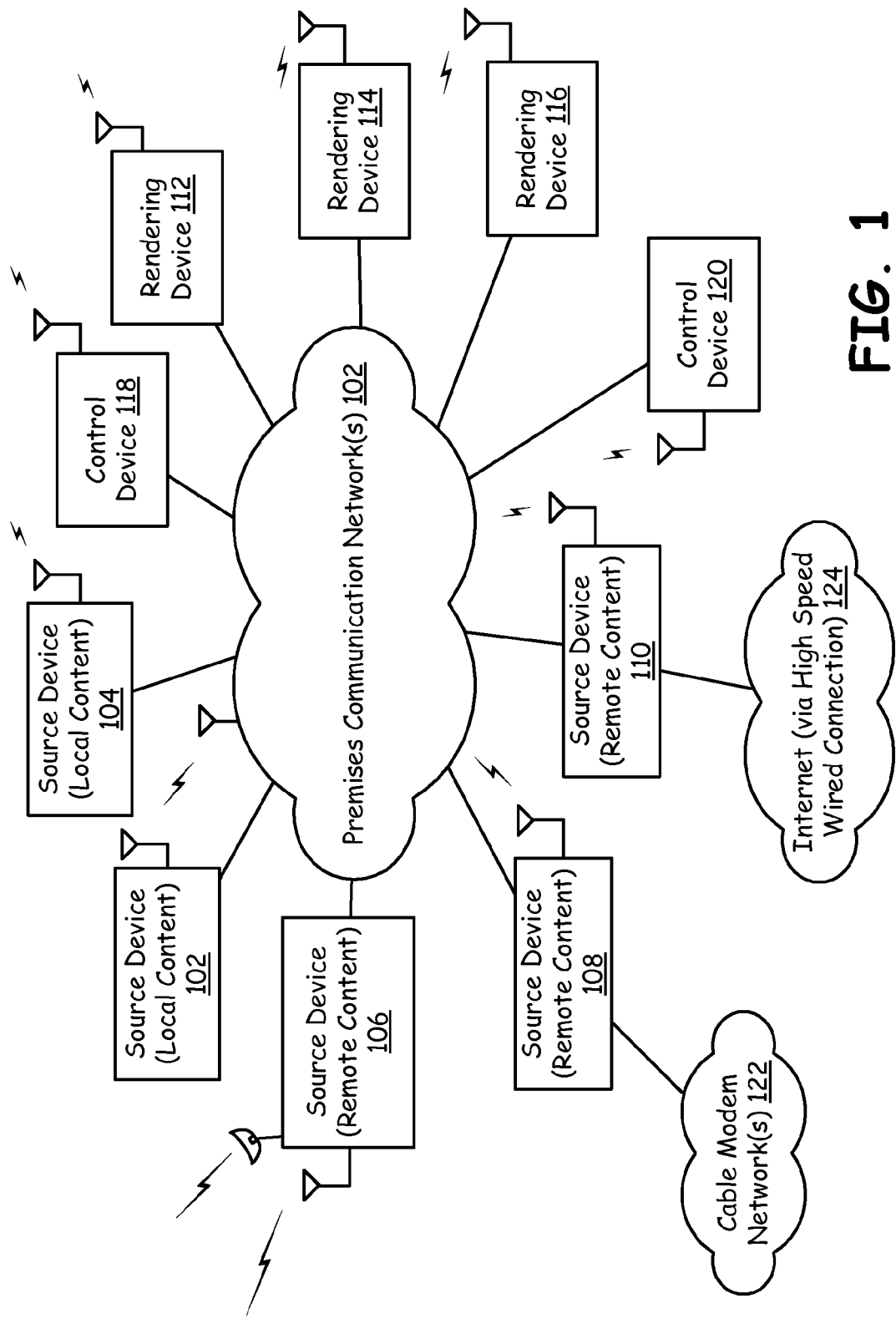
FIG. 1 is a system diagram illustrating a premises based multimedia communication system constructed and operating according to one or more embodiments of the present invention.

FIG. 1 is a system diagram illustrating a premises based multimedia communication system constructed and operating according to one or more embodiments of the present invention. The premises based multimedia communication system, FIG. 1 includes at least one source device that produces multimedia content, at least one rendering device that presents the multimedia content, and at least one premises communication network coupling at least one source device to at least one rendering device. With the embodiment of FIG. 1, a premises communication network 102 includes one or more sub networks that support wired and/or wireless networks. The premises communication network 102 will be described further in FIG. 2 and may include multiple wired networks and/or multiple wireless networks each of which supports the transfer of multimedia content between a source device and designation device. The premises based multimedia communication system may be present within a home, within a business, and/or may be present within another type of physical locale in which presentation of multimedia content is stored/transported/presented.

The multimedia content, in various embodiments of the present invention, includes audio content, video content, metadata, and/or control content. The premises communication network 102 supports packetized transport of the multimedia content. According to various embodiments of the present invention, the audio and/or video content is transported using a encoding/encryption technique in a packetized fashion. For example, the multimedia content may employ one or more versions of the Motion Pictures Expert Group (MPEG) standardized video operations, one or more embodiments of the Joint Photographic Experts Group (JPEG) standards, one or more of the embodiments of the MPEG, and/or various other audio, video, and/or image compressions/encoding standards.

Techniques for transferring video frames of the multimedia content will be described in detail herein. As is known, the MPEG video standard supports generation of independent video frames and predictive video frames. Generally, independent video frames are referred to by the "I" nomenclature while predictive video frames are referred to with the "B" and/or "P" nomenclature. The B nomenclature for predictive video frames refers to a backward predictive video frame while a P nomenclature for predictive video frame refers to a forward predictive video frame. As is generally known, an encoder encodes raw video information according to the MPEG video standard to produce a sequence of I, B, and P video frames. These video frames are packetized and transported to a decoding device, particularly a rendering device. The rendering device includes the decoder and reconstructs a video sequence from the I, B, and P video frames received from the source device. The video stream that the decoder produces is presented to a user by a rendering device or stored within the system for future presentation. Likewise, although much less complicated, a source device encodes raw audio information using the MPEG Layer-3 audio (MP3) standard, for example. In a fashion similar to the video encoding and decoding operations, the raw audio is encoded, and transported to a rendering device. The rendering device includes an audio decoder that constructs output audio from the input encoded audio stream and then presents the output audio to a user or stores the audio data. Of course, a different audio encoding/decoding standard may be employed to support transport of audio from a source device to a rendering device.

The multimedia communication system of FIG. 1 includes a plurality of source devices 102 and 104 that locally produces multimedia content. Examples of source devices 102 and 104 that locally produce multimedia content include CD players, DVD players, VCR players, video cameras, audio recorders, personal computers having hard drives and any other type of electronic device that is capable of locally providing multimedia content to the premises communications network 102. The source devices 102 and 104 couple to the premises communication network 102 via one or more of wired and/or wireless communication links.

The multimedia communication system of FIG. 1 further includes source devices 106, 108, and 110 that receive multimedia content from a remote location via a remote communication network. For example, source device 106 receives multimedia content from a remote location according to one or more supported interface operations, which may include satellite based communications, cellular based communications, WAN based communications, fixed wireless based communications, or other wireless based communications. The source device 106, for example, may be a satellite set-top box that includes a digital video recorder, which receives multimedia content via a satellite from an earth base satellite communications transmitter. The source device 106 wired and/or wirelessly couples to the premises communication network 102 and uses the premises communication network 102 to transport multimedia content to a rendering device 112, for example.

Source device 108 couples to a cable modem network 122 and is operable to receive multimedia content from the cable modem network 122. Source device 110 couples to the Internet 124 via one or more high speed wired connections. Each of source devices 108 and 110 receives multimedia content from a remote content source and may include local storage to store the multimedia content prior to transmitting the multimedia content to a rendering device via the premises communication network 102.

The premises multimedia communication system of FIG. 1 further includes a plurality of rendering devices 112, 114, and 116. These rendering devices 112, 114, and/or 116 receive multimedia content via the premises communication network 102 from one or more source devices and present the multimedia content to one or more users. The rendering devices 112, 114 and 116 couple to the premises communication network 102 via wired and/or wireless communication links.

Examples of the rendering devices 112 and 114, and 116 includes video monitors, surround sound audio systems, handheld video players, whole house speaker systems, personal computers, and/or any various other devices that is capable of presenting at least some multimedia content to a user.

The multimedia communication system of FIG. 1 further includes a plurality of control device 118 and 120. The control devices 118 and 120 may be employed to monitor and/or control the transfer of multimedia content within the multimedia communication system. For example, in some operations, one or more of the control devices 118 and 120 may identify multimedia content being transferred based upon meta data included in the multimedia content. In such case, the control device 118 and/or 120 determines whether better content exists somewhere within the multimedia communication system or external to the multimedia communication system. In such case, the control device 118 and/or 120 may alter the transfer of such multimedia content to secure a different source. In other operations, the control devices 118 and/or 120 may be employed to establish the transfer of multimedia content from a source device to a rendering device. In such case, the control device 118 and 120 may alter the transmission path and selected rendering device during the presentation of such multimedia content. In still other operations, the control device 118 and 120 may simply be employed to select preferred rendering devices based upon system conditions and/or to select a preferred portion of the premises communication network 102 to use for the transfer of multimedia content from a content source to a rendering device.

Figure 2:
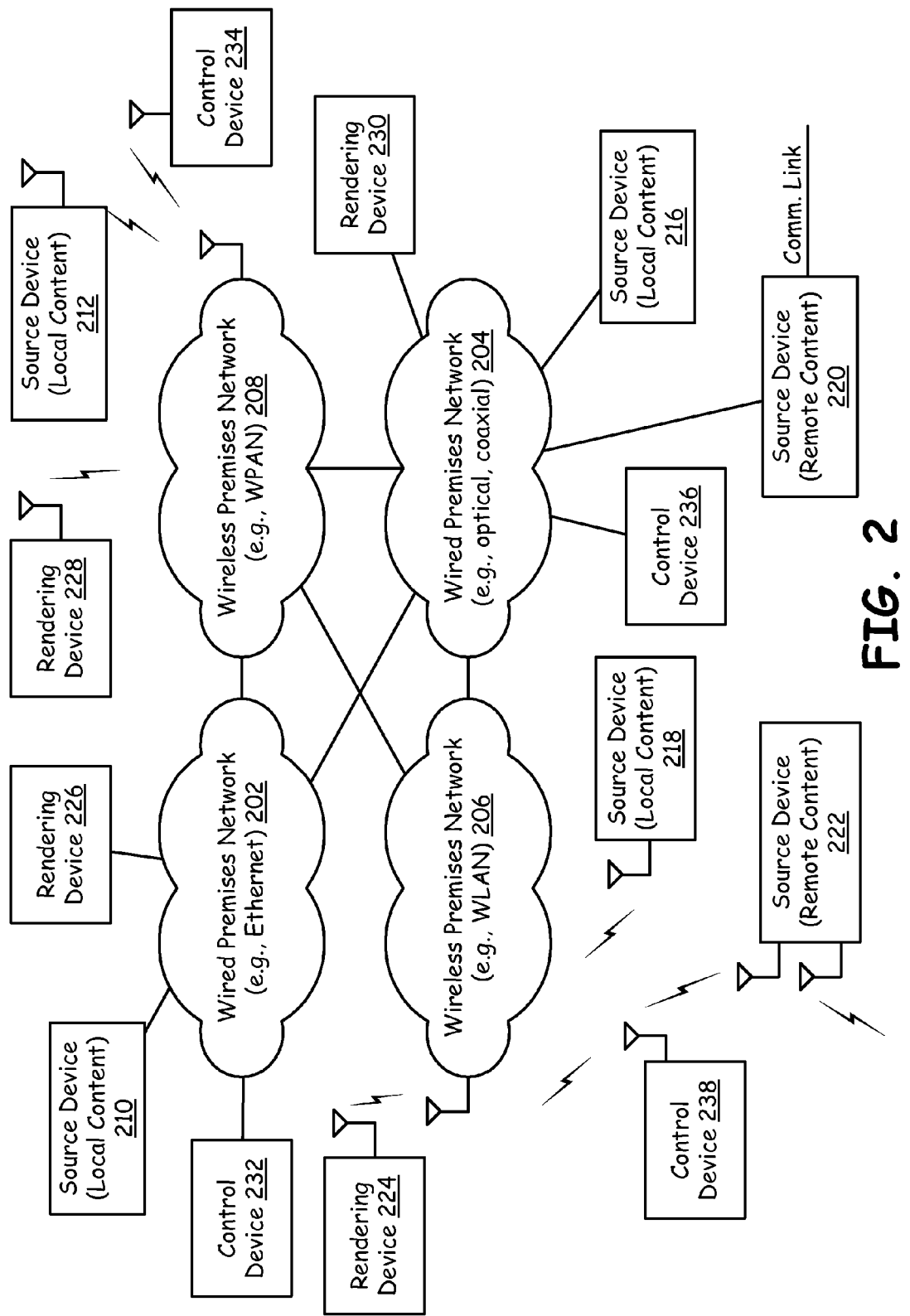
FIG. 2 is a system diagram illustrating an alternate construction of a premises based multimedia communication system constructed according to one or more embodiments of the present invention.

FIG. 2 is a system diagram illustrating an alternate construction of a premises based multimedia communication system constructed according to one or more embodiments of the present invention. As shown in FIG. 2, the premises based multimedia communication system includes a plurality of differing premises communication networks. These premises communication networks include a wired premises network 202, a wireless premises network 208, a wireless premises network 206, and a wired premises network 204. In the particular embodiment of FIG. 2, wired premises network 202 is an Ethernet network, wireless premises network 208 is a wireless personal area network (WPAN), wireless premises network 206 is a wireless local area network (WLAN), and wired premises network 204 is a coaxial network. The wireless premises network 208 may support the Bluetooth communications protocol standard, wireless premises network 206 may support one or more versions IEEE 802.11x protocol standards, and wired premises network 204 may support one or more optical and/or coaxial communication protocol standards. As is shown, the wired premises network 202, wireless premises network 206, wireless premises network 208 and wired premises network 204 inter-couple to one another via various wired and/or wireless communication links. For example, hubs, routers, or other interconnection devices may inter-couple these networks 202, 204, 206, and 208 for supported intercommunication.

The premises based multimedia communication system of FIG. 2 further includes source device 210, source device 212, source device 216 and source device 218, source device 220, and source device 222. The premises multimedia communication system further include rendering device 224, rendering device 226, rendering device 228, and rendering device 230. Note that within the embodiment of FIG. 2, the various rendering devices and source devices inter-couple to one or more wired and/or wireless networks via service wireless communication links.

The premises based multimedia communication system of FIG. 2 further includes control devices 234, 236, and 238. Each of these control devices 234, 236, and 238 may be capable of controlling the transfer of multimedia content from a source device to a rendering device. For example, control device 238 may be a cell phone that has enabled according to the DLNA operational standards. In such case, the control device 238, which is a cell phone, may be employed to control one or more of the source devices and/or rendering devices illustrated in FIG. 2. Likewise, control devices 234, which may be a laptop computer, and 236, which may be a desktop computer, may also support the DLNA standardized operations. According to the DLNA standardized operations, the control devices 234 and 236 may be employed to control any of the source devices and/or rendering devices of the premises based multimedia communications systems.

The premises based multimedia communications systems of FIGS. 1 and 2 support the various operations of the present invention will be described further herein with reference to FIGS. 4 through 13 The structure of a source device/rendering device/control device generally will be described with reference to FIG. 3. However, the structure of these devices may differ in other embodiments than that which is described with reference to FIG. 3.

Figure 3:
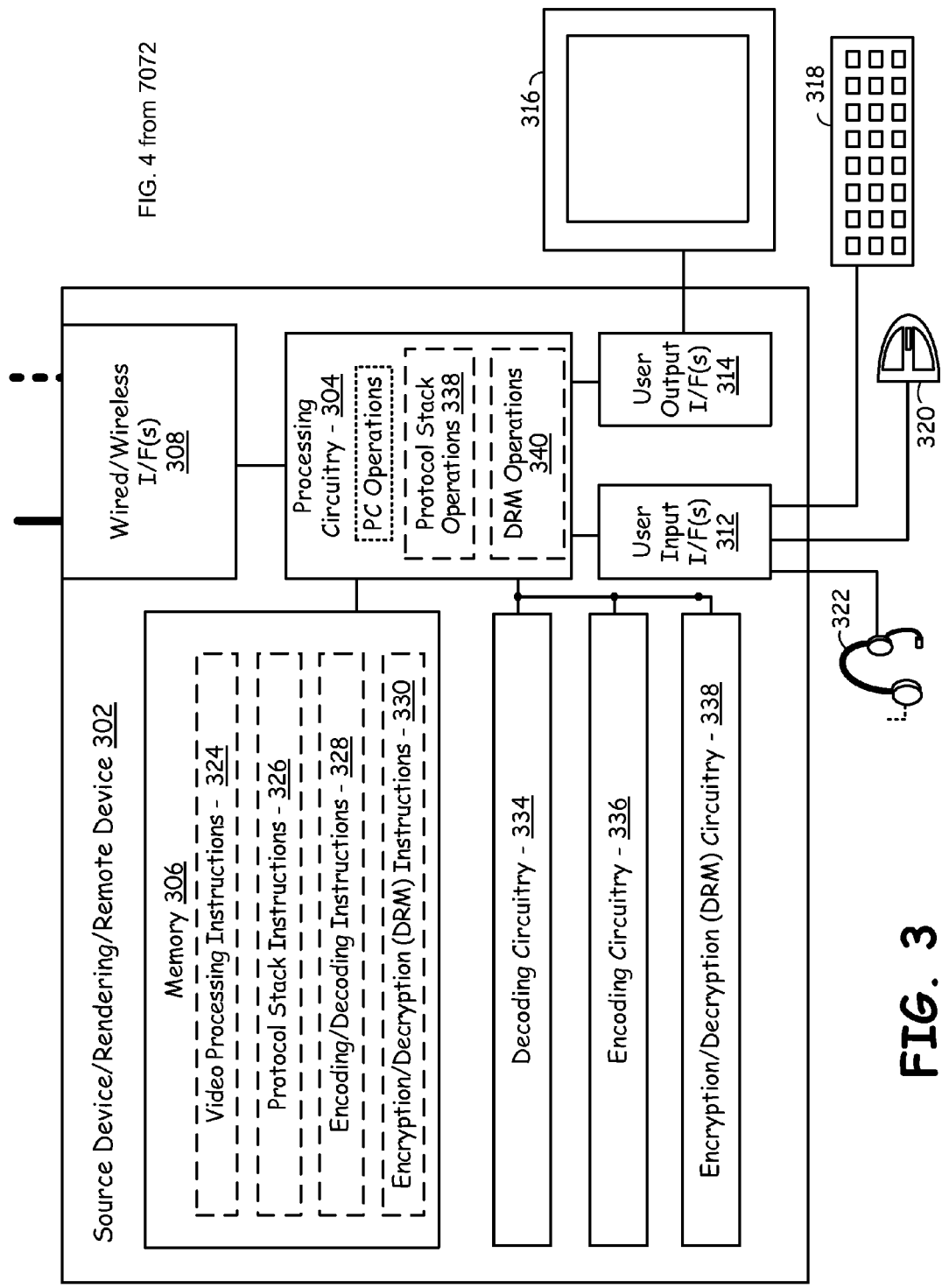
FIG. 3 is a block diagram illustrating generally the construct of a source device, a rendering device, and/or a control device constructed according to one or more embodiments of the present invention.

FIG. 3 is a block diagram illustrating generally the construct of a source device, a rendering device, and/or a control device constructed according to one or more embodiments of the present invention. The device 302 of FIG. 3 may take different forms in its differing embodiment. For example, the structure illustrated in FIG. 3 may be germane to a laptop or desktop computer but only partially germane to a cellular telephone. The device 302 includes processing circuitry 304, memory 306, a communications interface 308, and a user interface. With the structure of the device 302 of FIG. 3, the processing circuitry 304 may be a microprocessor, a digital signal processor, customized processing logic, generalized processing logic, or another type of circuitry that is capable of executing instructions to implement operations of the present invention. Thus, with the device of 302 of FIG. 3, the processing circuitry 304 performs personal computer operations, protocol stack operations 338, and Digital Rights Management (DRM) operations 340, among other operations.

The memory 306 of the device 302 of FIG. 3 is one or more of RAM, ROM, DRAM, Flash RAM, magnetic storage, optical storage, or other storage capable of storing digital information, which includes data and computer software instructions. The memory 304 stores video processing instructions 324, protocol stack instructions 326, encoding/decoding instructions 328, and encryption/decryption (DRM) instruction 330. Of course, the device 302 stores additional instructions as well for performing other of its conventional operations. Generally, the software instructions 324, 326, 328, and/or 330 are retrieved by processing circuitry 304 and executed to perform the operations of embodiments of the present invention, among other operations as are described further herein.

The user interface may include one or more user input interfaces 314 and/or one or more user output interfaces 314. The user input interface(s) 312 interface with one or more user input devices such as headset 322, mouse 320, and keyboard 318. User output interface(s) 314 interface with video monitor 316 and may interface with other devices such as speakers, etc. Of course, other user input and other user output devices may be employed with differing embodiments of the device 302 of the present invention.

The device 302 also includes decoding circuitry 334, encoding circuitry 336, and encryption/decryption (DRM) circuitry 336 in the illustrated embodiment. In other embodiments, the device 302 may include other specialized circuitry as well. Further, with the embodiment of FIG. 3, the decoding circuitry 334, encoding circuitry 336, and/or encryption/decryption circuitry 338 may not be replaced/performed by functionality executed by the processing circuitry 334 instead.

The user should understand that the structure illustrated in FIG. 3 for such a source device/rendering device/control device 302 is only generally shown. In various embodiments that support the principles of the present invention, various devices will have different structures and still fall within the scope of the present invention claim below. The structure of FIG. 3 is used generally to illustrate one example of the device that could implement the operations in structures of the present invention.

Figure 4:
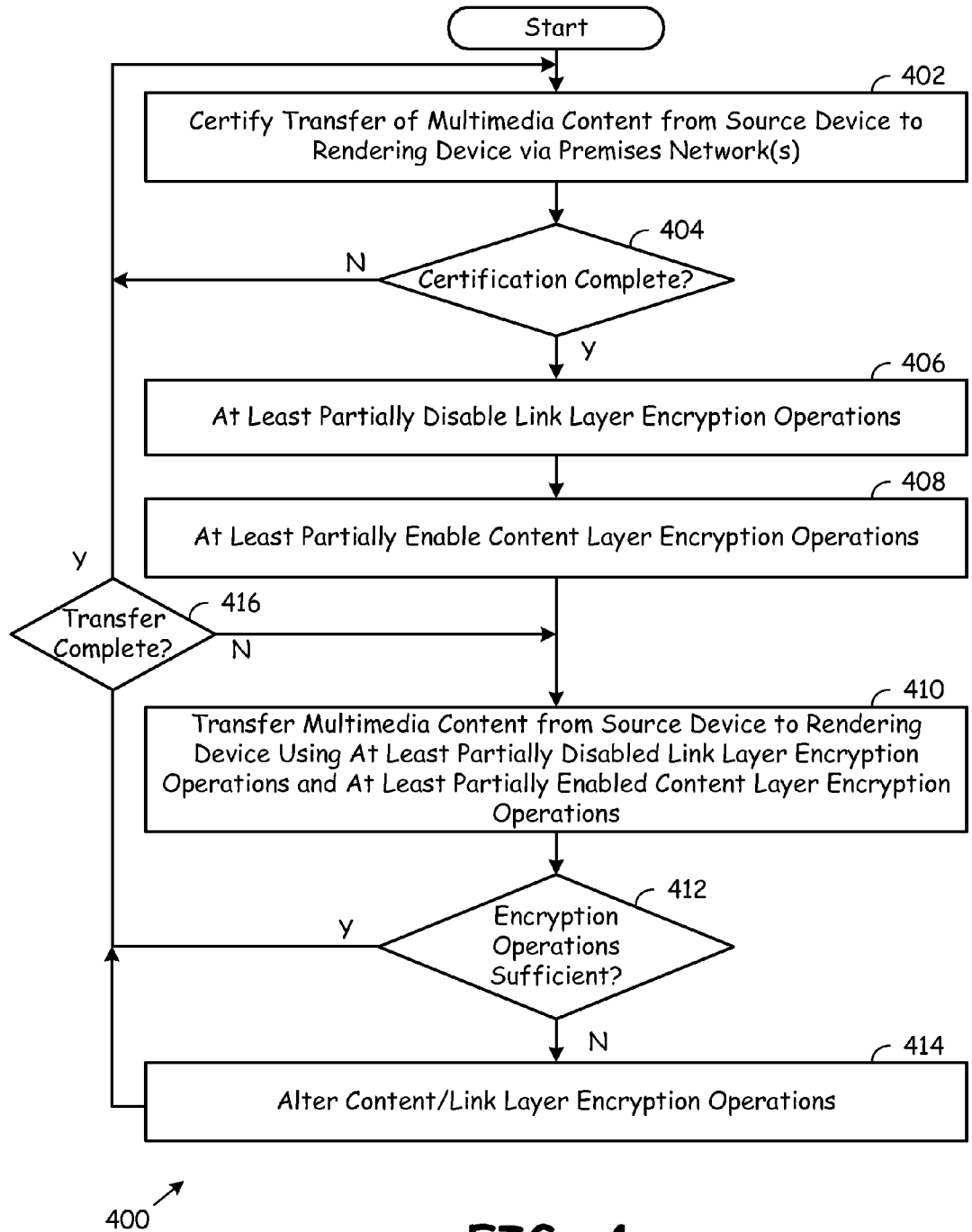
FIG. 4 is a flow chart illustrating operations for the transfer of multimedia content according to an embodiment of the present invention.

FIG. 4 is a flow chart illustrating operations for the transfer of multimedia content according to an embodiment of the present invention. With the operations 400 of FIG. 4, a premises based multimedia communication system includes at least one source device that produces multimedia content, at least one rendering device that presents the multimedia content, and at least one premises communications network coupling the source device to the rendering device. Such a structure is illustrated previously in FIGS. 1 and 2 and describes in conjunction therewith.

Figure 10A:
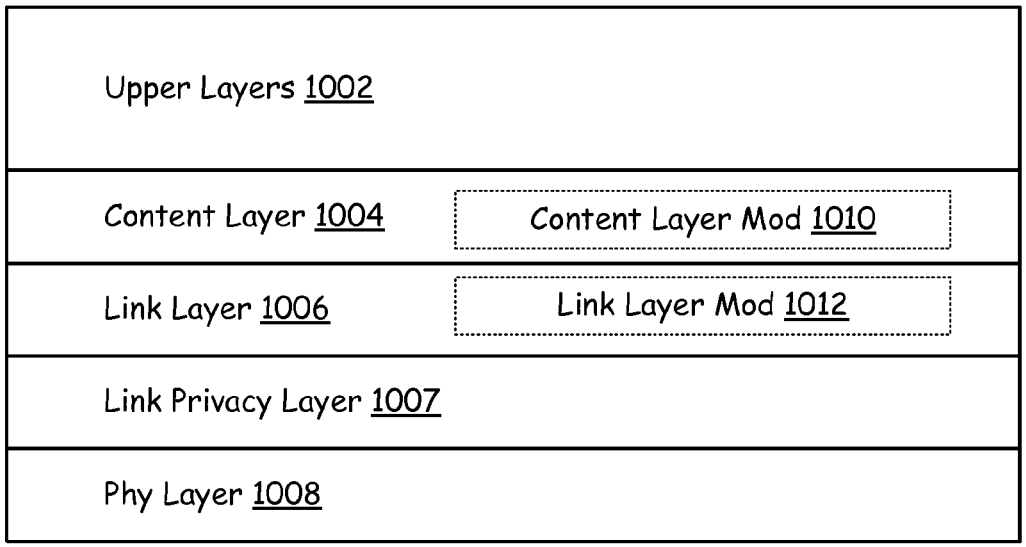
FIGS. 10A and 10B illustrate various embodiments of protocol stack construct(s) supporting the operations of the present invention.

The operations 400 in FIG. 4 commence with certifying the transfer of multimedia content from the source device to the rendering device via at least one premises network (Step 402). Because the multimedia content is protected via DRM in many embodiments, a source device typically will require cooperation with a rendering device prior to initiating transfer of the multimedia content. One example of such certification occurs according the DLNA operating standards. Particularly, the DLNA standard requires that DRM be supported in some embodiments and some operations by encryption at a link layer of a supported protocol communications stack. Referring temporarily to FIG. 10A, such a protocol stack 1000 as illustrated. As shown in FIG. 10A, link layer 1006 resides between content layer 1004 and physical layer 1008. According to the DLNA operations, link layer encryption may be required by some content owners to protect content that is transferred from a source device to a rendering device. However, because one or more of the premises communication networks servicing transfer of the multimedia content from the source device to the rendering devices have a bit error rate that is insufficient to support such link layer encryption operations. Thus, the operations 400 in FIG. 4 overcome such performance of the at least one premises communication network and also protect transmitted content from a DRM perspective.

According to the operations 400 of FIG. 4, certification for transfer of the multimedia content from the source device to the rendering device of Step 402 is performed until certification is completed in Step 404. After certification of the transfer of the multimedia content from the source device to the rendering device via at least one premises communication network using link layer encryption operations, the link layer encryption operation are at least partially disabled (Step 406), as will be further described herein with reference to subsequent FIGURES. However, in order to ensure that the transfer of multimedia content from the source device to the rendering device is protected, according to the operations 400 in FIG. 4, content layer encryption operations are at least partially enabled (Step 408). The content layer encryption operations are at least partially enabled at Step 408 for the transfer of the multimedia content from the source device to the rendering device via at least one premises communication network. Thus, after conclusion of the operations of Step 408, operations 400 include transferring multimedia content from the source device to the rendering device using at least partially disabled link layer encryption operations and at least partially enabled content layer encryption operations (Step 410). With these operations, the link layer encryption may include Digital Transmission Content Protection over Internet Protocol (DTCP/IP) or Link Privacy for Multimedia over Coax (MoCA). Various content layer encryption operations may be employed according the operations 400 in FIG. 4, including, but not limited to using Traffic Encryption Keys (TEKs), for example.

The operations of 400 in FIG. 4 may include a whether the encryption operations that are currently being used is sufficient (Step 412). Determining whether encryption operations are sufficient may be based upon the performance of the at least one premises communication network in, the quality of video being transported via the at least one premises communication network with the particular enabled encryption operations, or based upon other criteria. For example, if the at least one premises communication network is fully supporting the use of content layer encryption and link layer encryption but link layer encryption had been previously disabled, it may be appropriate to alter one or more of the link layer and/or content layer encryption operations (Step 414). Further, if at least one of the premises communications networks can still not sufficiently transport the multimedia content from the source device to the rendering device, the operations in Step 414 may further include altering one or more of the link layer encryption operations and/or the content layer encryption operations to reduce data throughput requirements or processing requirements of the source device and/or rendering device.

After the operations of Steps 412 and 414, the method 400 includes determining whether or not transfer of the multimedia content is completed from the source device to the rendering device (Step 416). If so, operation returns to Step 402 when the certification operations may be setup. If not, the operation proceeds to Step 410 where the multimedia content continues to be transferred from the source device to the rendering device. As the reader should appreciate from the description of FIG. 4, the content and/or link layer encryption operations employ may be tailored over time to suit the availability or quality of the at least one premises communication network. Further, these operations may be adjusted based upon the quality of the video and/or audio that is being delivered from the source device to the rendering device.

Figure 5A:
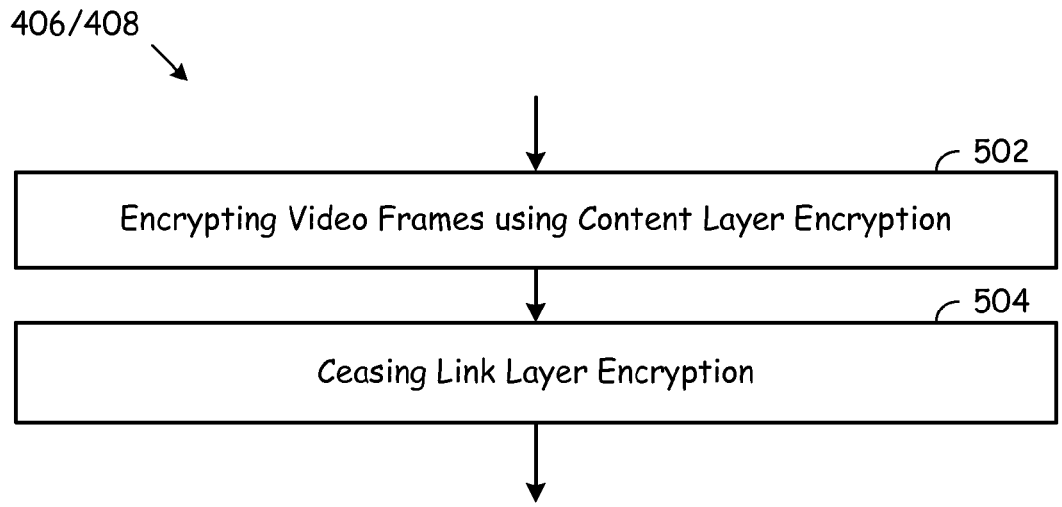
FIGS. 5A and 5B are flow charts illustrating particular embodiments of the operations of FIG. 4.
Figure 5B:
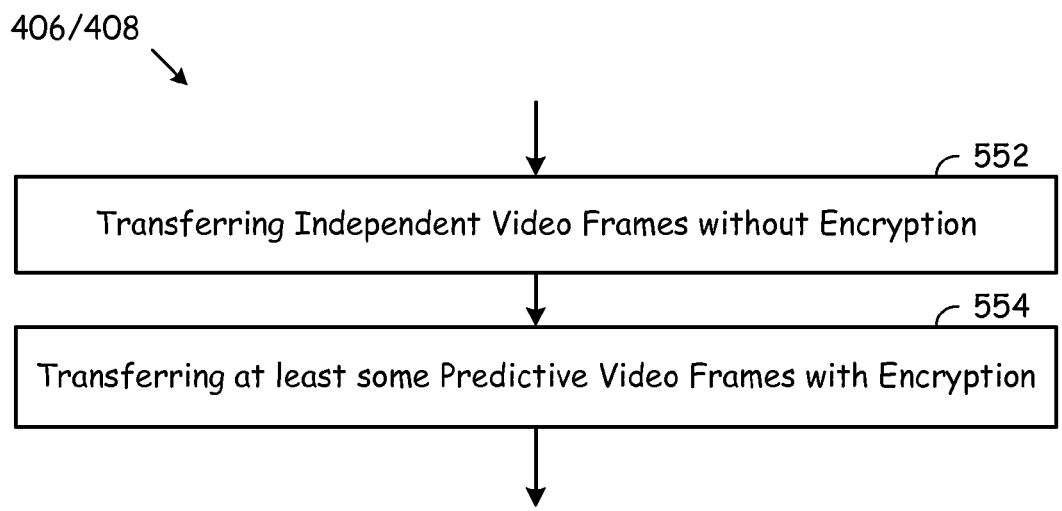

FIGS. 5A and 5B are flow charts illustrating particular embodiments of the operations of FIG. 4. Referring now to FIG. 5A, one particular embodiment of the Steps 406 and 408 of FIG. 4 are illustrated. With the embodiment of FIG. 5A, at least partially disabling link layer encryption operations and at least partially enabling content layer encryption operations for the transfer of the multimedia content from the source device to the rendering device via the at least one premises communications network includes encrypting video frames of the multimedia content using content layer encryption (Step 502). Further, the operations of FIG. 5A include ceasing all link layer encryption for the multimedia content transfer (Step 504).

Because the video frames of the multimedia content, which may be encoded to the MPEG operating standard, require much greater data throughput than does the audio content, the manner in which video frames are processed is particularly described with reference to FIG. 5A. As is generally known, the transfer of video multimedia content may heavily load a servicing network. Further, the transmission, receipt, and processing related to transfer of video frames may over load transmitting and receiving devices. Encryption operations further add to the complexity. When using link layer encryption, errors caused by the transport path are not discoverable at the link layer due to the encryption. Thus, errors in the video frame of the multimedia content propagate and severely degrade the quality of video transfer from the source device to the rendering device. For at least this reason, it is desirable in some operations to fully disable link layer encryption for the transfer of video frames.

Referring now to FIG. 5B, another embodiment of the Steps 406 and 408 of FIG. 4 is shown. Within the embodiment of FIG. 5B operations include transferring independent frames of the multimedia content without encryption (502) while transferring at least some predictive video frames with encryption (Step 504). With the embodiment of FIG. 5B, forward predictive P frames and/or backwards predictive B frames of the video frames stream may be transmitted using one or more of content layer and link layer encryption. However, with this technique, processing requirements for the encryption and decryption of the video frames are reduced while still providing protection of the media content with regard to DRM. Further, when a predictive video frame is transmitted with errors, it may simply be discarded without creating significant errors in an output video stream.

Figure 6A:
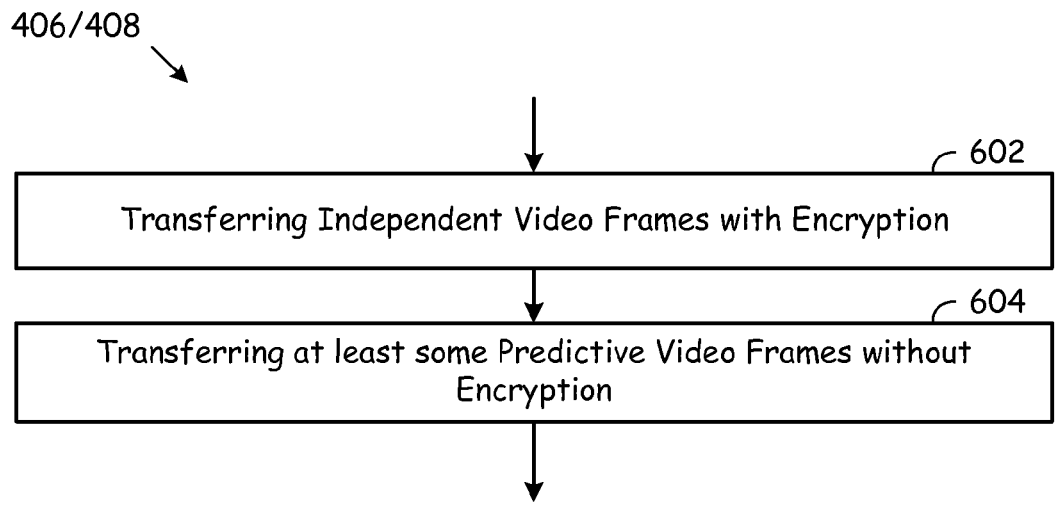
FIGS. 6A and 6B are flow charts illustrating particular embodiments consistent with the operations of FIG. 4.
Figure 6B:
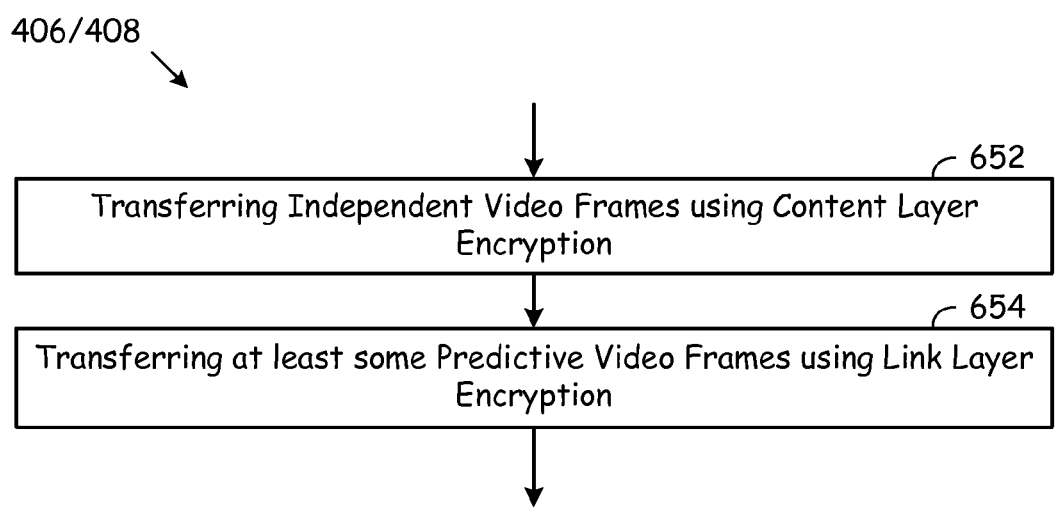

FIGS. 6A and 6B are flow charts illustrating particular embodiments consistent with the operations of FIG. 4. With the embodiment of FIG. 6A, the independent video frame stream of the multimedia content transfer is transferred with encryption (Step 502). Further, at least some predictive video frames are transferred without encryption (Step 504). The operations of Step 502 may include encrypting the independent video frames with content layer encryption. Alternatively, the operations of Step 502 may include transferring independent video frames with link layer encryption. With the embodiment of FIG. 6A, protection of video frames for DRM purposes is at least partially accomplished by using encryption for the independent video frames. However, by not using encryption for predictive video frames, errors created due to corruption of data transfer are reduced because link layer error detection and elimination operations are enabled.

Referring now to FIG. 6B, still another embodiment of the Steps 406 and 408 of FIG. 4 is illustrated. With the operations of FIG. 6B, independent video frames are transferred from the source device to the rendering device using content layer encryption (Step 652) while at least some predictive video frames are transferred using link layer encryption. With the operation of Step 654, some of the predictive video frames may be encrypted using link layer encryption while others may not be encrypted. With the operations of FIG. 6B, DRM considerations are addressed by using encryption at the content layer for the independent video frames even though link layer encryption operations are not employed for the independent video frames. Further, by using link layer encryption for at least some of the predictive video frames, DRM concerns are also addressed.

Figure 7:
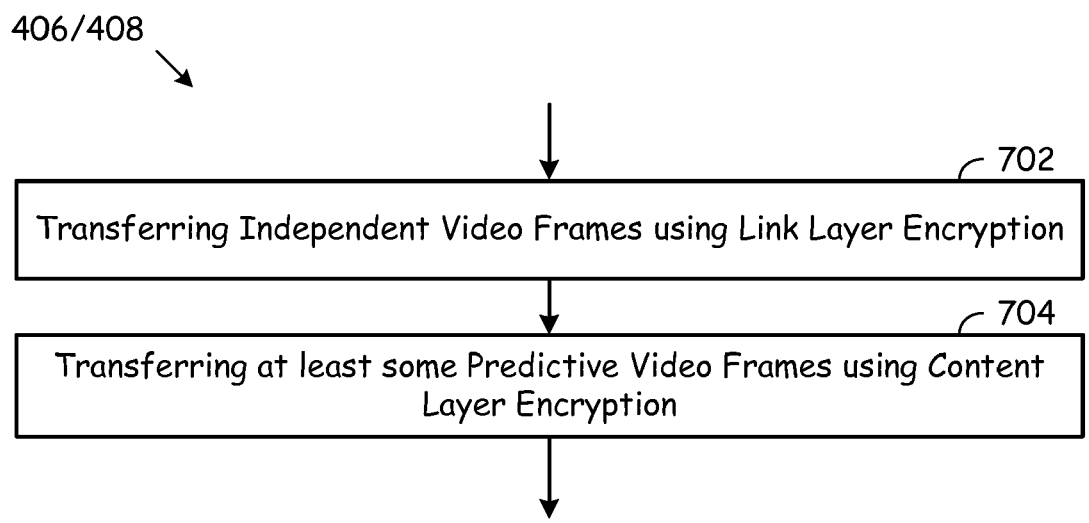
FIG. 7 is a flow chart illustrating particular embodiments consistent with the operations of FIG. 4.

FIG. 7 is a flow chart illustrating particular embodiments consistent with the operations of FIG. 4. With the embodiment of FIG. 7, operation includes transferring independent video frames from the source device to the rendering device using link layer encryption (Step 702). Further, the operation of FIG. 7 includes transferring at least some predictive video frames using content layers encryption (Step 704). Thus, with the operations of FIG. 7, some characteristics of standardized DLNA content or DRM are preserved by using link layer encryption for independent video frames. However, by transferring at least some predictive video frames using content layer encryption, the risk of error propagation is reduced by removing link layer encryption operations for such predictive video frames.

Figure 8:
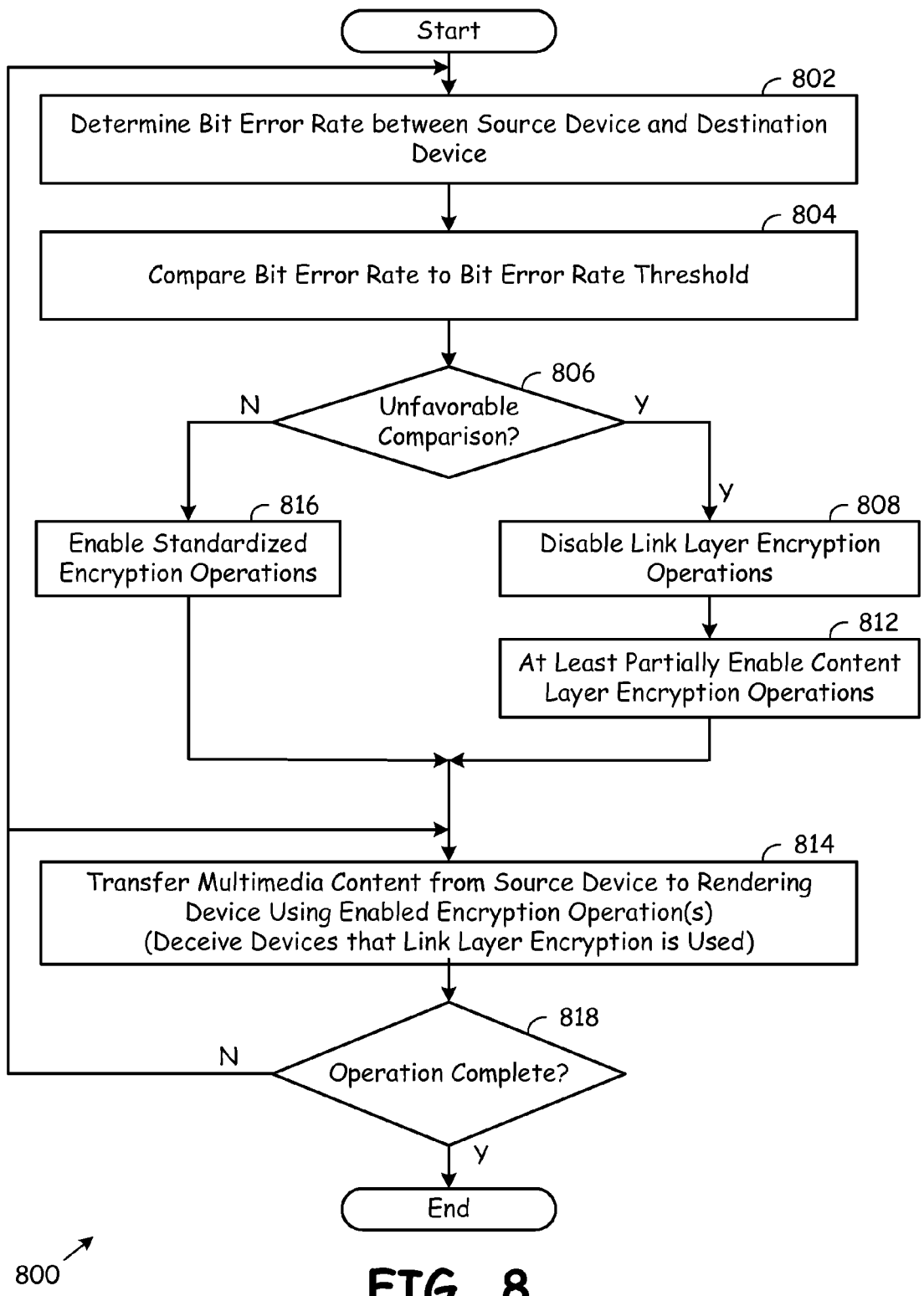
FIG. 8 is a flow chart illustrating one or more alternate embodiments of operations for the transfer of multimedia content according to the present invention.

FIG. 8 is a flow chart illustrating one or more alternate embodiments of operations for the transfer of multimedia content according to the present invention. Generally, the operations 800 of FIG. 8 consider the performance of the at least one premises communication network of the premises based multimedia communication system in making encryption decisions. Further, generally, when a supported bit error rate of one or more servicing premises communication networks is relatively higher, relatively lesser encryption is employed. This is because more bit errors must be corrected to overcome the relatively higher bit error rate of the servicing network.

Operations 800 commence with the determining a bit error rate between the source device and the destination device (Step 802). Determining this bit error rate typically requires cooperative effort between the source device and the designation device. For example, referring again to FIG. 2, a source device 210 may desire to transmit multimedia content to rendering device 230. In such a transfer of content, wired premises network 202 and wired premises network 204 are employed. In combination, the wired premises networks 202 and 204 have a bit rate that is relatively high as compared to a required bit error rate for transfer of the content. The source device 210 and rendering device 230 cooperatively determine this bit error rate by empirical operations.

Referring again to FIG. 8, once the bit error rate is determined, the source device (typically) will compare the bit error rate to a bit error rate threshold (Step 804). The bit error rate threshold is a threshold in a particular bit error rate, for example $10^{-6}$, that is deemed a bit error rate that is appropriate for altering encryption operations. Thus, upon an unfavorable comparison of Step 806, operations includes disabling link layer encryption operations (Step 808) and at least partially enabling content layer encryption operations (Step 812). However, when there is not an unfavorable comparison of the bit error rate and the bit error rate threshold at Step 804, as determined at Step 806, operations proceeds to enabling standardized encryption operations (Step 816). For example, within a DLNA network, the standardized encryption operations include link layer encryption.

From both Steps 816 and 812, operation includes transferring multimedia content from the source device to the rendering device using enabled encryption operations (Step 814). With the operations of Step 814, the multimedia content is transferred from the source device to the rendering device using the encryption operations that are established at Steps 816, 808, 812, and 816. Of course, the operations at Steps 808 and 812 that deviate from the operational standards may include deceiving the devices supporting the transfer, the source device and destination device into believing that link layer encryption is used according to the standardized operations, e.g., DLNA operations.

The multimedia content is transferred until the operations are complete (Step 818). At any point and time during the transfer of the multimedia content from the source device to the rendering device, one or more of the source and rendering devices may further characterize the communication link between the source device and the rendering device. Should bit error rate of the premises communication networks compare favorably or unfavorably in contradiction to prior comparison, the encryption operations that have been previously established may be altered. In one example of such operations, the bit error rate of the servicing network decreases such that the full link layer encryption operations may be serviced. Alternatively, the other operations, the servicing premises communication networks initially provided a lower bit error rate now operating at a higher bit error rate so that one or more link layer and/or content layer encryption operations must be ceased.

Figure 9:
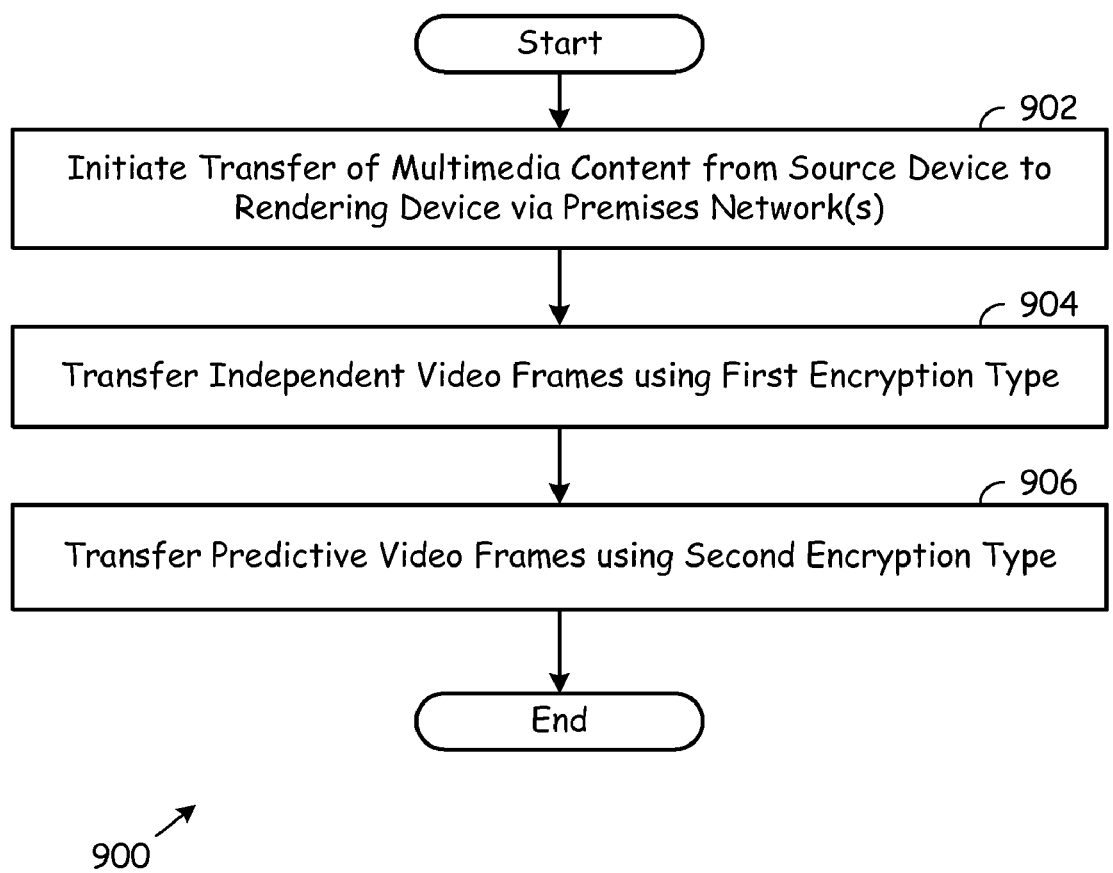
FIG. 9 is a flow chart illustrating other embodiments of operations for the transfer of multimedia content according to the present invention.

FIG. 9 is a flow chart illustrating other embodiments of operations for the transfer of multimedia content according to the present invention. Operations of 900 are accomplished within a premises based multimedia communication system having at least one source device that produces multimedia content that at least one rendering device that presents the multimedia content and at least one premises communication network coupling the source device from the rendering device. Operations commence with the source and destination devices initiating transfer of multimedia content from the source device to the rendering device via one or more premises networks (Step 902).

With the operations of 900 in FIG. 9, Step 904 includes transferring independent video frames using a first encryption type while Step 906 includes transferred predictive video frames using a second encryption type. The various embodiments of FIGS. 5A through 7 may be employed with the operations of 900 of FIG. 9. For example, the independent video frames may be transferred using content layer encryption while the predictive video frames may be transferred using link layer encryption. Alternatively, the first encryption type may include no encryption while the second encryption type may include one or more of link layer and content layer encryption. Still alternatively, the first encryption type may include link layer encryption while the second encryption type may include no encryption. Still further, the first encryption type may include content layer encryption while the second encryption type may include no encryption or link layer encryption. Still further, the first encryption type may include link layer encryption while the second encryption type may include content layer encryption.

The operations 900 in FIG. 9 may be employed in conjunction with the operations 800 in FIG. 8; the operations 900 particularly relevant to the operations of Steps 808 and 812 of FIG. 8. As the reader will appreciate, in order to sufficiently enable the transfer of video frames between the source device and the rendering device, encryption operations may have to be modified so that they are not consistent with a supported standard, e.g. DLNA standard. Further, the encryption techniques must or should sufficiently protect content transferred from the source device to the destination device to provide sufficient DRM. Thus, these competing interests may be met when needed due to potential shortcomings of the servicing premises communication networks.

Figure 10B:
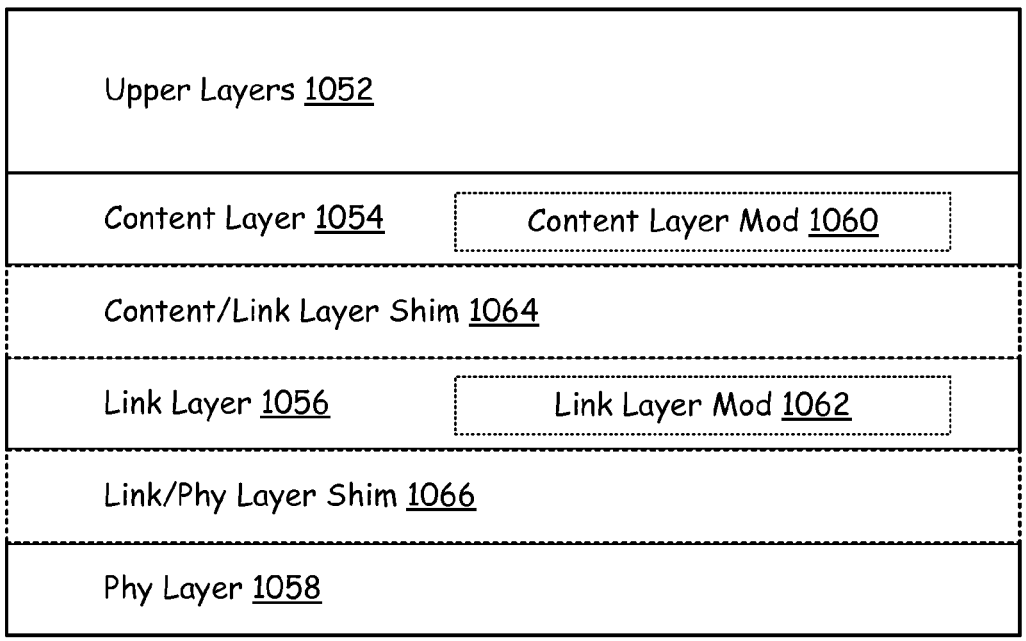

FIGS. 10A and 10B illustrate various embodiments of protocol stack construct(s) supporting the operations of the present invention. FIGS. 10A and 10B are examples of protocol stacks supported by the DLNA standards. The protocol stacks 1000 and 1050 of FIGS. 10A and 10B respectively, includes components that are generically recognizable as being components of the OSI protocol stack. However, the particular components of the protocol stacks of FIGS. 10A and 10B are unique to the teaching of the present invention.

Referring particularly to FIG. 10A, protocol stack 1000 includes upper protocol layers 1002, content protocol layer 1004, link protocol layer 1006, and physical layer 1008. Also shown in FIG. 10A is optional protocol layer link privacy layer 1007 which is employed when the MoCA protocol stack is embodied. Where the protocol stack 1000 is consistent with the DLNA operating standard, the link layer supports link layer encryption operations. The link layer encryptions operations are employed to protect the digital rights of the content being transferred from the source device to the rendering device. However, encryption of the link layer is problematic when the transferring network introduces bit errors into the transport stream that exceed a supportable bit error rate threshold. Because of the encryption operations with standard DLNA operations, the link layer 1006 is not able to correct errors introduced by such transport network and these errors are passed up the protocol suite, resulting in noticeable errors in the video output produced from the encoded video stream. Thus, according to the present invention, content layer modification 1010 and link layer modification 1012 are introduced into the content layer 1004 and the link layer 1006, respectively. The content layer modification 1010 and the link layer modification 1012 support operations previously described in reference to FIGS. 1 through 9.

Referring now to FIG. 10B, another embodiment of the protocol stack 1050 according to the present invention illustrated. The protocol stack of FIG. 10B includes upper protocol layers 1052, content layer 1054, link layer 1056 and physical layer 1058. These layers are consistent with the embodiment of the protocol stack 1000 of FIG. 10A. However, with the embodiment of protocol stack 1050 of FIG. 10B, a content/link layer shim 1064 exist between the content layer 1054 and the link layer 1056. Further, a link/physical layer shim 1066 is in place between link layer 1056 and the physical layer 1058. Further, in some embodiments content layer modification 1060 and link layer modification 1062 may also be employed with the embodiment of the protocol stack 1050 of FIG. 10B. In order to implement the operations of the present invention previously described in reference to FIGS. 1 through 9, with the protocol stack 1050 of FIG. 10B, the shims 1064 and 1066 inter-operate with the respectively adjacent protocol layers to accomplish the previously (and subsequently) described operations.

Figure 11:
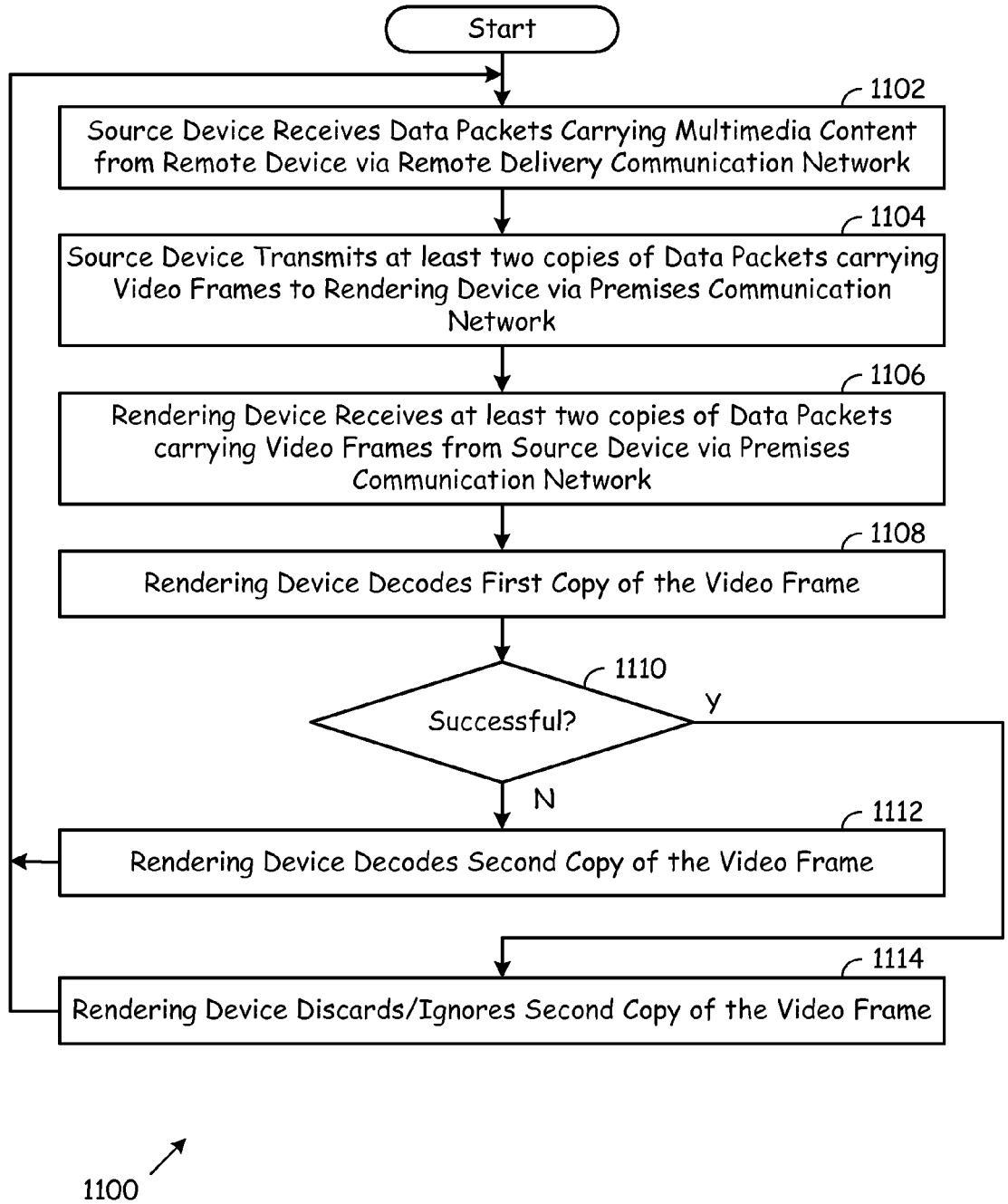
FIG. 11 is a flow chart illustrating operations of a premises based multimedia communication system according to another embodiment of the present invention.

FIG. 11 is a flow chart illustrating operations of a premises based multimedia communication system according to another embodiment of the present invention. The operations 1100 of FIG. 11 commence with the source device receiving data packets carrying multimedia content from a remote content source via at least one remote delivery communication network (Step 1102).

Referring again to FIG. 1, the source device may be one of source devices 106, 108, and/or 110. Each of these source devices 106, 108, and 110 receives multimedia content from a remote content source coupled to the source device via at least one remote delivery communication network. With respect to source device 106 the source device 106 receives the multimedia content via wireless mechanism such as satellite communication system, cellular communication system, WWAN communication system or another communication system. With reference to the source device 108, the source device 108 receives the multimedia content from a remote content source via cable modem network 122. Finally, with reference to the source device 110, the source device 110 receives multimedia content from a remote content source via the Internet 124. Connection to the Internet may be via one or more high speed wired connections.

Referring again to FIG. 11, the source device transmits at least two copies of data packets carrying video frames of the multimedia content to a rendering device via at least one premises communication network (Step 1104). As previously described, multimedia content is carried in data packets that are digitally transmitted from the source device to the rendering device. In one particular embodiment, the multimedia content includes both audio content and video content. The multimedia content may further include control information and additional information such as Meta data. As has also been previously described, the video content and audio content are separately encoded prior to transmission from the remote content source of the source device and embodiments. Encoding of video content may be accomplished according to the MPEG compression/encoding standard. In such case, video frames of the multimedia content include independent video frames and predictive video frames, as also have been previously described herein. Thus, with the operations of Step 1104, the source device transmits at least two copies of data packets carrying video frames to the rendering device via the premises communication network.

Referring again to FIG. 1, the source device 108, for example, transmits at least two copies of data packet carrying video frames to rendering device 112 via premises communication network 102. Referring to FIG. 2, the source device 220, for example, transmits at least two copies of the data packets carrying video frames via multiple components of the premises communication networks. With this example, source device 220 receives multimedia content via communication link and transmits the multimedia content to rendering device 226 via wired premises network 204 and wired premises network 202. Likewise, source device 220 may transfer the multimedia content to rendering device 228 via wired premises network 204 and wireless premises network 208. Each of the components of the premises communication network, i.e., 202, 204, 206, and 208 has unique performance characteristics from a bit error rate prospective. For example, wired premises network 204 may have a relatively low bit error rate while wireless premises network 208 may have a higher bit error rate. Further, wired premises network 204, which may be an optical network that has a relatively lower bit error rate than the Ethernet embodiments of the wired premises network 202. In both cases, the components of the premises communication network may have a relatively higher bit error rate for transmission from source device 220 to rendering device 226 or 228 than does the remote delivery communication network that carries the multimedia content from a remote content source to the source device 220.

With the source device 220 of FIG. 2, the communication link coupling the source device 220 to the remote content source via at least one remote delivery communication network has a relatively lower bit error rate, e.g., $10^{-3}$, than those the communication link coupling source device 220 to rendering device 226 or 228, e.g., $10^{-6}$. Thus, according to the present invention, the source device transmits at least two copies of data packets carrying video frames and multimedia content to rendering device 226 or 228 via at least one premises communication network.

Referring again to FIG. 11, the rendering device then receives the at least two copies of the data packet carrying video frames from the source device via the premises communication network (Step 1106). The rendering device then decodes a first copy of the video frame extracted from the data packets received at (Step 1106 and Step 1108). If the decoding of the first copy of the video frame is successful as determined in Step 1110, the rendering device discards or ignores the second copy of the video frame (11 14). However, if the decoding performs at Step 1108 is unsuccessful as determined at Step 1110 the rendering device decodes the second copy of the video frame (Step 1112). Operation from Step 1112 and 1114 returns to Step 1102.

Although the embodiments of the operations 1100 of FIG. 11 disclose only the transmission of two copies of data packets carrying video frames of the multimedia content to the rendering device, the principles of the present invention may be expanded to transmit a greater number of copies of data packets carrying video frames should the error rate of the premises communication network justify such transmissions. Further, the principles of the embodiment of FIG. 11 may be applied to audio data packets as well. However, as the reader should understand, digital audio content transmission is less susceptible to bit errors during transmission since such errors would simply result in degradation of voice quality. With video content however, errors in transmission of the video frames and their respective unsuccessful coding will result in noticeable problems with a viewed video stream. When these errors particularly relate to independent video frames, artifacts created due to these errors may extent across multiple frames.

With the operations 1100 in FIG. 11, the multiple transmissions of the data packets carrying video frames to the multimedia content from the source device to the rendering device via at least one premises communication network are irrespective/ independent of any Automatic Re-transmission reQuest (ARQ) operations that may be supported by the source device and the rendering device. Thus, even though ARQ operations may be employed to correct the errors, the transmission of multiple copies of the data packets carrying the video frames is also independently employed.

Figure 12:
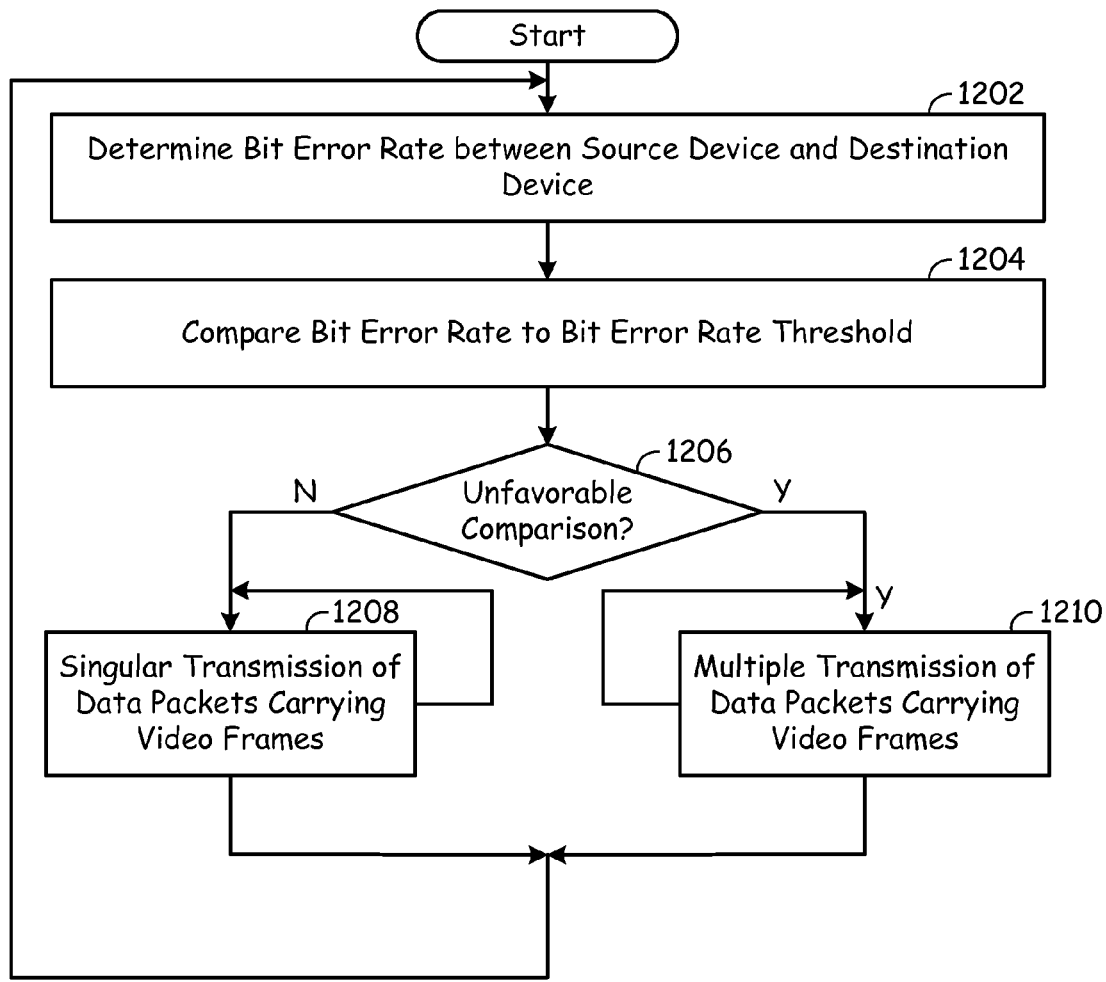
FIG. 12 is a flow chart illustrating yet another operation of a source device of the premises multimedia communication system according to an embodiment of the present invention.

FIG. 12 is a flow chart illustrating yet another operation of a source device of the premises multimedia communication system according to an embodiment of the present invention. The operations 1200 of FIG. 12 commence with the source device and rendering device determining a bit error rate there between that is supported by at least one premises network (Step 1202). This bit error rate is representative of the communication path within the premises communication network between the source device and the destination device. In a typical premises communication network, the bit error rate may be $10^{-3}$ while a bit error rate supported by a remote delivery communication network over which the source device receives the multimedia content may be characterized by a $10^{-6}$ bit error rate, for example. Thus, the transmission quality supported by the premises communication network may be relatively worse than that supported by the remote delivery communication network. Alternatively, Step 1202 may characterize the performance of the at least one premises communication network in a different fashion. This fashion may be a signal-to-noise ratio of other characterization of the quality of the communication link between the source device and the rendering device.

The source device then compares the bit error rate supported by at least one premises communication network to a bit error rate threshold of (Step 1204). The bit error rate threshold is a bit error rate characterization that is determined to be sufficient for transfer of multimedia content from the source device to the destination device to provide acceptable video quality. When the comparison is unfavorable, as determined in Step 1206, the source device transmits multiple copies of data packets carrying video frames to the rendering device (Step 1210). Alternatively, when the comparison is favorable as determined in Step 1206, the source device singularly transmits data packets carrying video frames to the rendering device (Step 1208).

From each of Steps 1208 and 1210, operations may return to Step 1202. However, the operations of each of Steps 1208 and 1210 may continue until the multimedia transfer is complete. For example, once the source device determines that multiple transmissions of data packets carrying video frames are required, the source device will transmit the multiple copies of the data frames carrying video frames until the video transfer ends. Likewise, when the source device determines that singular transmission of data packets carrying video frames to the rendering device it is warranted such singular transmission will continue until the transfer of the video content has been fully completed. However, at any point in time, the source device may re-evaluate its decision whether to singularly or multiply transmit data packets carrying video frames to the destination device by returning to Step 1202.

Figure 13:
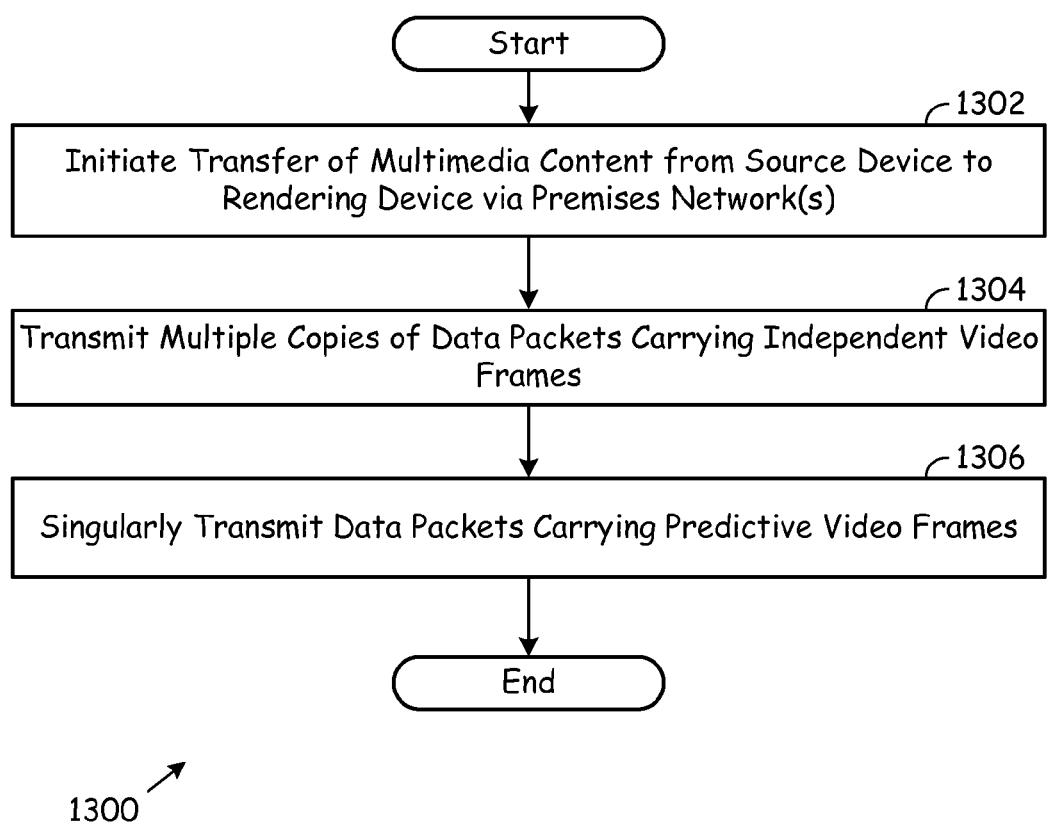
FIG. 13 is a flow chart illustrating a particular operation according to the embodiment of FIGS. 11 and 12.

FIG. 13 is a flow chart illustrating a particular operation according to the embodiment of FIGS. 11 and 12. The operations of 1300 of FIG. 13 include the source device initiating transfer of multimedia content to a rendering device via the premises communication network (Step 1302). Operations continue with the source device transmitting multiple copies of data packets carrying independent video frames to the rendering device (Step 1304). Further, the operations 1300 of FIG. 13 include the source device singularly transmitting data packets carrying predictive video frames to the rendering device (Step 1306). The operations 1300 of FIG. 13 are performed because the error free receipt of independent video frames reduces the detectable problems associated with bit errors in the transfer of the data packets from the source device to the rendering device more than does the multiple copy transfer of the predictive video frames.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for use in a premises based multimedia communication system having at least one source device that produces multimedia content, at least one rendering device that presents the multimedia content, and at least one premises communication network coupling the source device to the rendering device, the method comprising:
   certifying transfer of the multimedia content from the source device to the rendering device via the at least one premises communication network using link layer encryption operations;

after certification of the transfer of the multimedia content from the source device to the rendering device via the at least one premises communication network using link layer encryption operations, at least partially disabling the link layer encryption operations for the transfer of the multimedia content from the source device to the rendering device via the at least one premises communication network; and when the link layer encryption operations are at least partially disabled, at least partially enabling content layer encryption operations for the transfer of the multimedia content from the source device to the rendering device via the at least one premises communication network.

2. The method of claim 1, wherein the link layer encryption operations comprises at least one of Digital Transmission Content Protection over Internet Protocol (DTCP/IP) and link privacy for Multimedia over Coax (MoCA).

3. The method of claim 1, wherein at least partially disabling the link layer encryption operations and at least partially enabling content layer encryption operations for the transfer of the multimedia content from the source device to the rendering device via the at least one premises communication network comprises:
encrypting at least some video frames of the multimedia content transfer using content layer encryption;
ceasing link layer encryption of video frames of the multimedia content transfer.

4. The method of claim 1, wherein at least partially disabling the link layer encryption operations and at least partially enabling content layer encryption operations for the transfer of the multimedia content from the source device to the rendering device via the at least one premises communication network comprises:
transferring independent (I) video frames of the multimedia content without encryption; and
transferring at least some predictive (B and/or P) video frames of the multimedia content using at least one of content layer encryption and link layer encryption.

5. The method of claim 1, wherein at least partially disabling the link layer encryption operations and at least partially enabling content layer encryption operations for the transfer of the multimedia content from the source device to the rendering device via the at least one premises communication network comprises:
transferring independent (I) video frames of the multimedia content using at least one of content layer encryption and link layer encryption; and
transferring at least some predictive (B and/or P) video frames of the multimedia content without encryption.

6. The method of claim 1, wherein at least partially disabling the link layer encryption operations and at least partially enabling content layer encryption operations for the transfer of the multimedia content from the source device to the rendering device via the at least one premises communication network comprises:
transferring independent (I) video frames of the multimedia content using content layer encryption; and
transferring at least some predictive (B and/or P) video frames of the multimedia content using link layer encryption.

7. The method of claim 1, wherein at least partially disabling the link layer encryption operations and at least partially enabling content layer encryption operations for the transfer of the multimedia content from the source device to the rendering device via the at least one premises communication network comprises:
transferring independent (I) video frames of the multimedia content using link layer encryption; and
transferring at least some predictive (B and/or P) video frames of the multimedia content using content layer encryption.

8. The method of claim 1:
wherein at least partially disabling the link layer encryption operations and at least partially enabling content layer encryption operations for the transfer of the multimedia content from the source device to the rendering device via the at least one premises communication network includes ceasing link layer encryption of video frames of the multimedia content transfer; and
further comprising deceiving at least one of the source device and the rendering device that link layer encryption continues to be implemented for the video frames of the multimedia content transfer.

9. A method for use in a premises based multimedia communication system having at least one source device that produces multimedia content, at least one rendering device that presents the multimedia content, and at least one premises communication network coupling the source device to the rendering device, the method comprising:
initiating transfer of the multimedia content from the source device to the rendering device via the at least one premises communication network;
transferring independent (I) video frames of the multimedia content from the source device to the rendering device using a first encryption technique, wherein using the first encryption technique includes at least partially disabling link layer encryption operations; and
transferring predictive (B and/or P) video frames of the multimedia content from the source device to the rendering device using a second encryption technique, wherein using the second encryption technique includes at least partially enabling link layer encryption operations.

10. The method of claim 9, wherein:
the first encryption technique comprises no encryption; and
the second encryption technique comprises link layer encryption.

11. The method of claim 9, wherein:
the first encryption technique comprises no encryption; and
the second encryption technique comprises content layer encryption.

12. The method of claim 9, wherein:
the first encryption technique comprises link layer encryption.

13. The method of claim 12, wherein:
the first encryption technique comprises link layer encryption; and
the second encryption technique comprises content layer encryption.

14. The method of claim 9, wherein:
the first encryption technique comprises content layer encryption.

15. The method of claim 14, wherein:
the first encryption technique comprises content layer encryption; and
the second encryption technique comprises link layer encryption.

16. A method for use in a premises based multimedia communication system having at least one source device that produces multimedia content, at least one rendering device that presents the multimedia content, and at least one premises communication network coupling the source device to the rendering device, the method comprising:

certifying that the transfer of the multimedia content from the source device to the rendering device via the at least one premises communication network supports link layer encryption operations;

in response to the certifying, at least partially disabling the link layer encryption operations for the transfer of the multimedia content from the source device to the rendering device via the at least one premises communication network; and further in response to the certifying, at least partially enabling content layer encryption operations for the transfer of the multimedia content from the source device to the rendering device via the at least one premises communication network.

17. The method of claim 16, wherein the link layer encryption operations comprises at least one of Digital Transmission Content Protection over Internet Protocol (DTCP/IP) and link privacy for Multimedia over Coax (MoCA).

18. The method of claim 16, wherein at least partially disabling the link layer encryption operations and at least partially enabling content layer encryption operations for the transfer of the multimedia content from the source device to the rendering device via the at least one premises communication network comprises:

encrypting at least some video frames of the multimedia content transfer using content layer encryption;

ceasing link layer encryption of video frames of the multimedia content transfer.

19. The method of claim 16, wherein at least partially disabling the link layer encryption operations and at least partially enabling content layer encryption operations for the transfer of the multimedia content from the source device to the rendering device via the at least one premises communication network comprises:

transferring independent (I) video frames of the multimedia content without encryption; and transferring at least some predictive (B and/or P) video frames of the multimedia content using at least one of content layer encryption and link layer encryption.

20. The method of claim 16, wherein at least partially disabling the link layer encryption operations and at least partially enabling content layer encryption operations for the transfer of the multimedia content from the source device to the rendering device via the at least one premises communication network comprises:

transferring independent (I) video frames of the multimedia content using at least one of content layer encryption and link layer encryption; and transferring at least some predictive (B and/or P) video frames of the multimedia content without encryption.

21. The method of claim 16, wherein at least partially disabling the link layer encryption operations and at least partially enabling content layer encryption operations for the transfer of the multimedia content from the source device to the rendering device via the at least one premises communication network comprises:

transferring independent (I) video frames of the multimedia content using content layer encryption; and transferring at least some predictive (B and/or P) video frames of the multimedia content using link layer encryption.

22. The method of claim 16, wherein at least partially disabling the link layer encryption operations and at least partially enabling content layer encryption operations for the transfer of the multimedia content from the source device to the rendering device via the at least one premises communication network comprises:

transferring independent (I) video frames of the multimedia content using link layer encryption; and transferring at least some predictive (B and/or P) video frames of the multimedia content using content layer encryption.

23. The method of claim 16:

wherein at least partially disabling the link layer encryption operations and at least partially enabling content layer encryption operations for the transfer of the multimedia content from the source device to the rendering device via the at least one premises communication network includes ceasing link layer encryption of video frames of the multimedia content transfer; and further comprising deceiving at least one of the source device and the rendering device that link layer encryption continues to be implemented for the video frames of the multimedia content transfer.

\* \* \* \* \*